United States Patent [19]

Watanabe

[11] 4,176,933
[45] Dec. 4, 1979

[54] INDICATING APPARATUS FOR CAMERA

[75] Inventor: Sakuji Watanabe, Warabi, Japan

[73] Assignee: Nippon Kogaku K.K., Tokyo, Japan

[21] Appl. No.: 883,645

[22] Filed: Mar. 6, 1978

[30] Foreign Application Priority Data

Mar. 5, 1977 [JP] Japan .................. 52-23315

[51] Int. Cl.² ............... G03B 15/05; G03B 17/18
[52] U.S. Cl. ............................... 354/127; 354/289
[58] Field of Search ............... 354/53, 60 A, 60 L, 354/60 F, 127, 128, 289; 340/378 R; 116/114 J

[56] References Cited

U.S. PATENT DOCUMENTS

| | | | |
|---|---|---|---|
| 3,443,498 | 5/1969 | Bihlmaier | 354/128 |
| 3,675,547 | 7/1972 | Uchiyama et al. | 354/33 X |
| 3,688,664 | 9/1972 | Mashimo | 354/60 L X |
| 3,699,858 | 10/1972 | Ogiso et al. | 354/60 L X |
| 3,971,050 | 7/1976 | Okuno et al. | 354/128 |
| 4,007,469 | 2/1977 | Land et al. | 354/128 X |
| 4,016,575 | 4/1977 | Uchiyama et al. | 354/60 F X |
| 4,087,829 | 5/1978 | Ueda et al. | 354/53 X |

Primary Examiner—L. T. Hix
Assistant Examiner—William B. Perkey
Attorney, Agent, or Firm—Shapiro and Shapiro

[57] ABSTRACT

An indicating apparatus comprises a switching means provided in connection with a flash device and generating a ready-light signal when the charging of the flash device is completed. A ready lamp composed of a light-emitting diode is lighted upon receipt of the ready-lamp signal. An another switching means is provided in connection of a shutter dial of the camera and is connected to produce a synchronization signal when the shutter speed is selected in a state synchronizable with the flash from the flash device. A synchronization indicating lamp is composed of a light-emitting diode to be lighted upon receipt of the synchronization signal.

7 Claims, 5 Drawing Figures

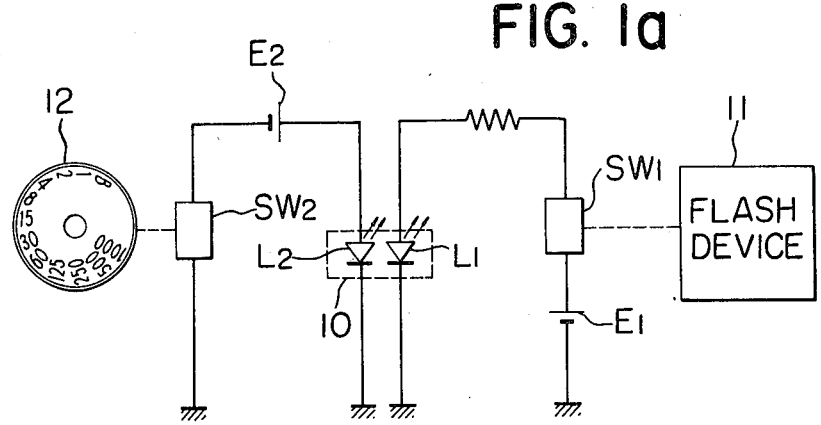
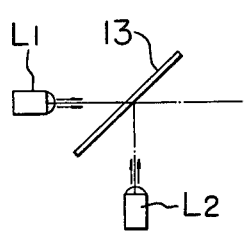
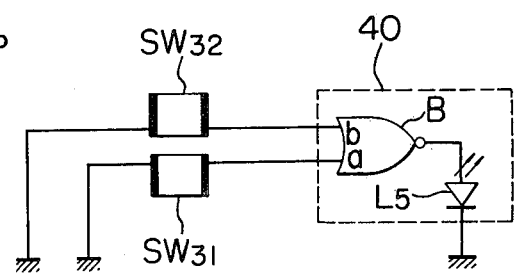
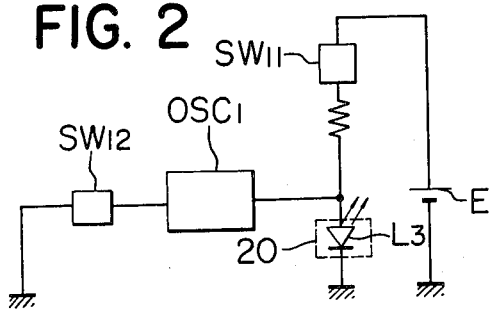
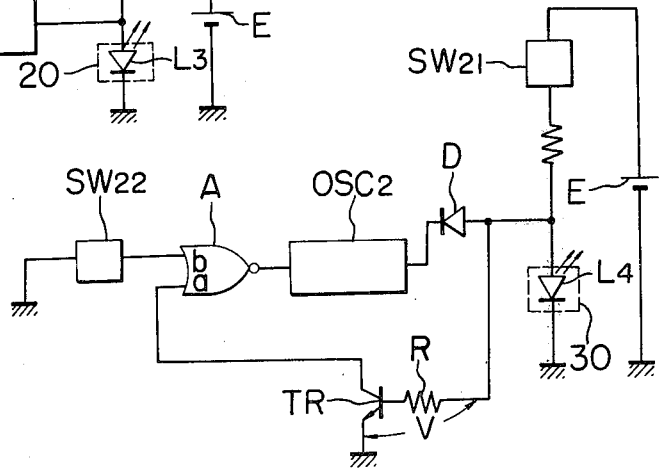

INDICATING APPARATUS FOR CAMERA

BACKGROUND OF THE INVENTION

1. Field of the Invention

The present invention relates to an indicating apparatus for indicating the completion of capacitor charging in a flash device to be actuated in connection with the shutter release of a camera and also for indicating that the duration of exposure is selected synchronizable with the light from said flash device.

2. Description of the Prior Art

In a conventional camera the photographing operation with flash has been conducted upon confirmation from a marking for example on a shutter dial that the duration of exposure determined by a shutter-speed setting means is selected so as to be synchronizable with the flash light from the flash device and upon further confirmation of the completion of capacitor charging of said flash device by the lighting of a charging indicator lamp located distant from the indication of shutter speed.

Such photographing operation is cumbersome and results in errors as the photographer is required to perform two confirming steps by means of the shutter speed indication and the charging indicator lamp provided in separate locations and further required to judge from the indication of shutter speed if the shutter speed at photographing is synchronized with the light from the flash device.

SUMMARY OF THE INVENTION

An object of the present invention is to provide an indicating apparatus avoiding the above-mentioned drawbacks and allowing easy confirmation at the photographing with flash.

An another object of the present invention is to provide an indicating apparatus capable of providing different indications allowing identification of a state wherein the shutter is synchronizable and charging is completed, a state wherein either condition is lacking and a state wherein both conditions are lacking.

BRIEF DESCRIPTION OF THE DRAWINGS

Embodiments of the invention are shown in the accompanying drawings wherein:

FIGS. 1a and 1b are electric circuit diagrams of a first embodiment of the present invention;

FIGS. 2, 3 and 4 are circuit diagrams of a second, third and fourth embodiment, respectively, of the present invention.

DESCRIPTION OF THE PREFERRED EMBODIMENTS

In the following the present invention will be explained in detail by the embodiments thereof shown in the attached drawings. Referring to FIG. 1a illustrating the electric circuit of a first embodiment of the present invention, E1 and E2 are power supply sources, while a switching means SW1 is provided in connection with a flash device 11 so as to be closed to generate a ready-light signal when the charging of said flash device 11 is completed. A ready lamp L1 composed for example of a light-emitting diode is connected in series with said power source E1 and lighted upon receipt of said ready-lamp signal. Another switching means SW2 is provided in connection for example of a shutter dial 12 of the camera and is connected in series with said power source E2 so as to produce a synchronization signal when the shutter speed is selected in a state synchronizable with the flash from said flash device 11, namely when the duration of exposure is selected longer (for example 1/60, 1/30 sec. etc.) than the predetermined synchronizable shutter-speed (for example 1/125 sec.). There is provided a synchronization indicating lamp L2 composed for example of a light-emitting diode so as to be lighted upon receipt of said synchronization signal. Said synchronization lamp L2 is positioned adjacent to said ready lamp L1 to constitute a combined indicating means 10.

In the above-described structure, the switching means SW1 is closed to light the ready light L1 upon completion of the flash device 11. Also the switching means SW2 is closed to light the synchronization indicating lamp L2 when the selected shutter speed is synchronizable with the flash from said flash device 11. Thus the simultaneous lighting of two lamps located in a combined indicating means represents that the charging of flash device is completed and that the selected shutter speed is synchronizable with the flash.

FIG. 1b shows a preferred embodiment of two lamps L1, L2 of the indicating means 10 in FIG. 1a wherein a half mirror 13 is provided to allow observation of the lighted lamps L1 and/or L2 from the point P. As the lights from said lamps overlap each other, it is further preferable to employ lamps or filters of different colors or shapes.

FIG. 2 shows the electric circuit of a second embodiment of the present invention which is different from the foregoing first embodiment in that the indicating means 20 is composed of a single indicating element.

In said second embodiment a switching means SW11 is closed upon completion of the charging of the flash device in a similar manner as the switching means SW1 in the first embodiment to transmit a ready-light signal to an indicating lamp L3 while another switching means SW12 is open to release a synchronization signal (zero signal) when the shutter speed is synchronizable with the flashlight from said flash device and is closed to release a non-synchronization signal in other instances. An oscillating circuit OSC1 is activated only upon receipt of a non-synchronization signal from said switching means SW12 to transmit a non-synchronization signal of an oscillating current to the indicating lamp L3 and, upon receipt of a synchronization signal, gives no output to transmit a synchronization signal to the lamp L3. In this case the elements SW12 and OSC1 constitute a circuit for releasing a synchronization signal.

Thus, in the case wherein the charging is not complete and the shutter speed is so selected as not to synchronize with the flash, the switching means SW11 is in an open state to give no ready-light signal while the switching means SW12 is closed to energize the oscillating circuit OSC1. Thus the output of the oscillating circuit OSC1 is transmitted to the indicating lamp L3 to cause intermittent lighting. Upon completion of the charging of the flash device in this state, the switching means SW11 is closed to add the output thereof to the output of said oscillating circuit OSC1 thereby causing alternating weak-strong lighting of the lamp L3. In a case wherein the charging is not completed and the shutter speed is so selected as to be synchronizable with the flash, the switching means SW11 and SW12 are both open to maintain the oscillating circuit OSC1 inactive whereby the indicating lamp L3 remains extinguished. Upon completion of the charging in this state, the switching means SW11 is closed but the oscillating circuit OSC1 is maintained inactive due to the open state of the switching means SW12, whereby the indicating lamp L3 is maintained in continuously lighted state. Namely, the synchronization signal caused by the closed state of said switching means SW12 is transmitted to the lamp L3 by the absence of output from the oscillating circuit OSC1, whereby the indicating lamp L3, upon receipt of said synchronization signal and the ready-light signal from the switching means SW11, is continuously lighted to indicate both the completion of charging and the synchronization state.

FIG. 3 shows the electric circuit of a third embodiment of the present invention which is different from the foregoing second embodiment in that the oscillating circuit is activated only upon receipt of the ready-light signal and the non-synchronization signal to transmit a non-synchronization signal to the indicating lamp.

In this embodiment, there is provided, similar to the switching means SW1 or SW11 in the foregoing embodiments, a switching means SW21 to transmit a ready-light signal to an indicating lamp L4 provided as an indicating means 30. A transistor TR is rendered conductive upon receipt of the ready-light signal to transmit the ready-light signal to an input terminal a of a NOR circuit to be explained later. A switching means SW22, similar to the foregoing SW12, is open when the shutter speed is so selected as to be synchronizable with the flash of the flash device and closed when not synchronizable. Upon closure of said switching means SW22 a non-synchronizing signal is transmitted to an input terminal b of said NOR circuit. Said NOR circuit A activates, upon receipt of both the ready-light signal and the non-synchronization signal, an oscillating circuit OSC2 the output of which renders a diode D conductive and non-conductive alternately to cause intermittent light of the indicating lamp L4. Thus the elements TR, A, OSC2 and D constitute a control circuit functioning only upon receipt of the non-synchronization signal and the ready-light signal to release a non-synchronization signal and remains inactive upon receipt of the synchronization signal to release a corresponding signal to the indicating lamp L4, while the elements SW22, TR, A, OSC2 and D constitute a circuit for generating the synchronization signal. The functioning voltage of said transistor TR is so selected as to transmit the ready-light signal to the input terminal a of NOR circuit regardless of the conductive or non-conductive state of the diode D. For example, the diode D is rendered conductive when the anode-cathode voltage is equal to or higher than 0.6V, the transistor TR is rendered conductive when the voltage V, consisting of base-emitter voltage and voltage across the base resistor R is equal to or higher than 0.6V, and the indicating lamp L4 is lighted when a voltage equal to or higher than 1.5V is applied thereacross.

In such composition, the switching means SW21 is maintained in open state when the charging of flash device is not complete to give no ready-light signal. Consequently, regardless whether the shutter speed is synchronizable with the flash, the lamp L4 remains extinguished to indicate the unfinished charging of the flash device.

Now, in a case wherein the charging of the flash device is completed and the shutter speed is so selected as to be synchronizable with the flashlight from said flash device, the input terminal b of the NOR circuit A receives the synchronization signal to be in a high-level state. Also the closure of the switching means SW21 transmit a ready-light signal to light the indicating lamp L4 and to render the transistor TR conductive, whereby the input terminal a of the NOR circuit A is shifted from a high level to a low level state. However, as the other input terminal b is maintained at a high level by said synchronization signal, the output of said NOR circuit A remains at a low level to maintain the oscillator OSC2 inactive and the diode D non-conductive. Thus, a synchronization signal (zero signal) is transmitted to the indicating lamp L4. In this manner, the voltage applied to said indicating lamp L4 is maintained above the functioning voltage thereof, whereby said lamp L4 is maintained in lighted state, indicating the completion of charging of flash device and the selected shutter speed being synchronizable with the flash of said flash device.

Now, in case wherein charging of flash device is completed but the shutter speed is so selected as not to be synchronizable with the the flash from flash device, the switching means SW21 is closed to light the indicating lamp L4 and to render the transistor TR conductive in a manner the same as explained before. However, as the switching means SW22 remains conductive due to the selected shutter speed, the input terminal b of the NOR circuit A receives a non-synchronization signal or low level signal. Thus, receiving low level signals on the input terminals a and b, the NOR circuit A gives a high level output to activate the oscillator B whereby the cathode of diode D alternately assumes a high level state and a low level state. In this manner, the voltage applied to the indicating lamp L4 alternately assumes a functioning voltage (1.5V) and a non-functioning voltage (0.6V) whereby the lamp L4 is intermittently lighted to indicate the completion of charging of the flash device and the selected shutter speed being not synchronizable with the flashlight.

The first to third embodiments explained above, being capable of indicating three states; i.e. a state with completed charging and synchronizable shutter speed, a state with uncompleted charging and unsynchronizable shutter speed, and a state with completed charging and unsynchronizable shutter speed, by means of the state of the indicating means L, allow identification of the unsatisfied condition from the state of indication and are therefore convenient for the operation.

Also in the second and third embodiments it will be readily understood that the switch SW12 or SW22 and the switch SW11 or SW21 may be provided so as to respectively cooperate with the flash device and the shutter speed setting means on the camera.

Now reference is made to FIG. 4 showing the electric circuit of a fourth embodiment of the present invention which is different from the foregoing first to third embodiments in that an indicating lamp L5 is lighted only upon receipt of both the ready-light signal and the synchronization signal and is extinguished in other instances.

In this embodiment, the indicating means 40 is composed of an NOR circuit B and an indicating lamp L5. A switching means SW31 is closed upon completion of the charging of the flash device to transmit a ready-light signal to an input terminal a of said NOR circuit B, while another switching means SW32 is closed when the shutter speed is selected in a synchronizable state to transmit a synchronization signal to the other input terminal b of said NOR circuit B. The NOR circuit B activates the indicating lamp L5 upon receipt of said ready-light signal and the synchronization signal. The NOR circuit used in this embodiment may naturally be replaced by an another suitable circuit, for example an AND circuit. The circuit B capable of activating the indicating lamp L5 upon receipt of said two signals is called an indication control circuit.

In the above, composition, upon closing of the switching means SW31 and SW32, the NOR circuit B receives low level signals at the input terminals thereof to release a high level output, thus lighting the indicating lamp L5, to indicate both the completion of charging and the synchronizable state of shutter speed at a time.

The present embodiment, being different from the foregoing embodiments, is structured to light the indicating lamp L5 only upon receipt of said two signals and is characterized by reduced electric power consumption.

In the foregoing embodiments, the indicating apparatus is shown in a state wherein the flash device is combined with the camera. The indicating apparatus of the present invention can thus be employed by icorporating the circuit for generating a ready-light signal and the circuit for generating a synchronization signal respectively in the flash device and the camera and combining said flash device and camera when they are used, or can be employed in a camera with a built-in flash device.

Also the indicating means, if located within a camera finder, will provide an additional advantage of allowing the confirmation of completed charging and synchronizable state of shutter speed during the viewing through the finder thereby allowing the photographer to take the photograph at a right moment.

What I claim is:

1. An indicating apparatus for indicating the completion of charging of a capacitor of a flash device to be actuated in connection with the shutter release of a camera and also for indicating that the shutter speed selected by a shutter speed setting means of the camera is synchronizable with the light from the flash device, comprising an illuminable indicating element capable of being placed in different states, and operating means responsive to the charging of said capacitor and to said shutter speed setting means for causing said indicating element to have a predetermined first state when charging of said capacitor is complete and the selected shutter speed is synchronizable with the light from said flash device, for causing said indicating element to have a predetermined second state when charging of said capacitor is complete and the selected shutter speed is non-synchronizable with the light from said flash device, and for causing said indicating element to have neither of said first and second states when charging of said capacitor is in process but is incomplete.

2. An indicating apparatus in accordance with claim 1, wherein said first state is a constant illumination state and said second state is a repetitively varying illumination state.

3. An indicating apparatus in accordance with claim 2, wherein said operating means causes said indicating element to be illuminated by alternating weak and strong illumination when charging of said capacitor is complete and when the selected shutter speed is non-synchronizable with the light from said flash device, causes said indicating element to be illuminated and extinguished alternately when charging of said capacitor is incomplete and the selected shutter speed is non-synchronizable with the light from said flash device, and causes said indicating element to be extinguished when charging of said capacitor is incomplete and the selected shutter speed is synchronizable with the light from said flash device.

4. An indicating apparatus in accordance with claim 2, wherein said operating means comprises first switch means for supplying a steady voltage to said indicating element when charging of said capacitor is complete, oscillator means for supplying a varying voltage to said indicating element, and second switch means for actuating said oscillator means when the selected shutter speed is non-synchronizable with the light from said flash device.

5. An indicating apparatus in accordance with claim 4, further comprising means for preventing said oscillator means from supplying said varying voltage to said indicating element when charging of said capacitor is complete.

6. An indicating apparatus in accordance with claim 5, wherein the last-mentioned means comprises third switch means responsive to the supplying of said steady voltage to said indicating element.

7. An indicating apparatus in accordance with claim 4, wherein said first switch means connects a source of voltage to said indicating element in a first circuit and wherein said second switch means connects said oscillator means to said indicating element in a second circuit, said circuits being arranged in parallel.

* * * * *